United States Patent
Ishii et al.

(10) Patent No.: US 7,119,521 B2
(45) Date of Patent: Oct. 10, 2006

(54) MULTI-OUTPUT DC-DC CONVERTER

(75) Inventors: Takuya Ishii, Suita (JP); Hiroshi Saito, Tokyo (JP); Kazuhiko Nagaoka, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 299 days.

(21) Appl. No.: 10/811,675

(22) Filed: Mar. 29, 2004

(65) Prior Publication Data
US 2004/0196676 A1    Oct. 7, 2004

(30) Foreign Application Priority Data
Apr. 1, 2003   (JP) .............................. 2003-098145

(51) Int. Cl.
*G05F 1/10*   (2006.01)
*H02M 7/00*   (2006.01)
*H02H 3/18*   (2006.01)

(52) U.S. Cl. ........................................ 323/222; 363/65
(58) Field of Classification Search ................ 363/222, 363/223, 225, 265, 267, 268, 271, 282, 285, 363/65
See application file for complete search history.

(56) References Cited

U.S. PATENT DOCUMENTS

| | | | | |
|---|---|---|---|---|
| 5,070,294 A | * | 12/1991 | Nochi | ........................ 323/267 |
| 5,400,239 A | | 3/1995 | Caine | |
| 6,151,222 A | * | 11/2000 | Barrett | ......................... 363/16 |
| 6,486,567 B1 | * | 11/2002 | Sano et al. | .................... 307/32 |
| 6,522,110 B1 | | 2/2003 | Ivanov | |
| 6,903,535 B1 | * | 6/2005 | Liu et al. | .................... 323/222 |
| 6,946,820 B1 | * | 9/2005 | Ishii et al. | .................. 323/222 |

FOREIGN PATENT DOCUMENTS

| | | |
|---|---|---|
| JP | 63249470 A | 10/1988 |
| WO | WO 03/026116 A1 | 3/2003 |

OTHER PUBLICATIONS

Wing-Hung KI, et al., "Single-Inductor Multiple-Output Switching Converters", *32nd Annual IEEE Power Electronics Specialists Conference*, vol. 1 of 4, pp. 226-231, (2001).

Dongsheng MA, et al., "A Single-Inductor Dual-Output Integrated DC/DC Boost Converter for Variable Voltage Scheduling", *Design Automation Conference*, pp. 19-20, (2001).

* cited by examiner

*Primary Examiner*—Matthew V. Nguyen
(74) *Attorney, Agent, or Firm*—Akin Gump Strauss Hauer & Feld, LLP

(57) ABSTRACT

A multi-output DC-DC converter comprising a plurality of converters configured so that an inductor 2 and a main switch 31 are used in common, wherein a first output voltage Vo1 is output from a circuit comprising a diode 41 and a first output capacitor 51, and a second output voltage Vo2 is output from a circuit comprising an auxiliary switch 32, a diode 42 and a second output capacitor 52. The control circuit 80 of the multi-output DC-DC converter has an output detection circuit 81, an oscillation circuit 82, a PWM circuit 83, a frequency divider circuit 84 and a drive circuit 85, and controls a plurality of outputs at high efficiency and reliability.

3 Claims, 10 Drawing Sheets

|   | I | II | III | IV | V | VI | VII | VIII |
|---|---|---|---|---|---|---|---|---|
| Vx1 | H | H | H | H | L | L | L | L |
| Vx2 | H | H | L | L | H | H | L | L |
| Vx3 | H | L | H | L | H | L | H | L |
| Vg31 | V31 | L | V31 | L | V31 | L | H | L |
| Vg32 | V32 | V32 | L | L | H | H | L | L |
| Vg33 | V33 | H | V33 | H | V33 | H | L | H |

I : NORMAL OPERATION CONDITION
VIII : ABNORMAL CONDITION (SHUTDOWN)

MULTI-OUTPUT DC-DC CONVERTER

BACKGROUND OF THE INVENTION

The present invention relates to a multi-output DC-DC converter, for use in a variety of electronic appliances, configured to receive a DC voltage from a battery or the like and to supply controlled DC voltages to a plurality of loads.

An apparatus having a circuit configuration shown in FIG. 8 has been used conventionally as a multi-output DC-DC converter. The input DC voltage Ei of a DC power supply 1 is input to the conventional multi-output DC-DC converter shown in FIG. 8. A main switch 3 formed of an N-MOSFET, an inductor 2, a diode 4 and a first output capacitor 5 are provided to constitute a boost converter (step-up converter). A first output voltage Vo1 is output from the first output capacitor 5 to a first load 6. A control circuit 7 adjusts the ON/OFF period ratio of the main switch 3 to control the first output voltage Vo1. The first output voltage Vo1 is stepped down by a series. regulator 8 and output as a second output voltage Vo2 from a second output capacitor 9 to a second load 10.

The operation of the boost converter shown in FIG. 8 will be described below briefly.

First, when the main switch 3 is ON, the input DC voltage Ei is applied to the inductor 2. At this time, a current flows through the inductor 2 and magnetic energy is stored. Next, when the main switch 3 becomes OFF, the magnetic energy stored in the inductor 2 is released via the diode 4 as a current for charging the first output capacitor 5. When it is assumed that the main switch 3 is turned ON/OFF in a constant cycle, the energy output via the inductor 2 in each cycle is higher as the ON period of the main switch 3 is longer, and the first output voltage Vo1 is higher as the ON period of the main switch 3 is longer. In other words, the control circuit 7 controls the first output voltage Vo1 by adjusting the ON/OFF period ratio of the main switch 3. On the other hand, the second output voltage Vo2 obtained from the first output voltage Vo1 is output via the series regulator 8.

In the conventional multi-output DC-DC converter configured as described above, a loss due to the series regulator 8 was caused, thereby lowering conversion efficiency. In addition, since the conventional multi-output DC-DC converter used a configuration comprising a plurality of switching converters, such as the above-mentioned boost converter, to obtain multiple outputs, the number of components increased, whereby an apparatus incorporating such converters was made larger in size and higher in cost.

FIG. 9 is a circuit diagram showing a three-output boost converter configured to control a plurality of outputs by using less number of components (see Official Gazette of Japanese Examined Patent Publication No. Hei 7-40785, for example). Numerals assigned to components shown in FIG. 9 are the same as those shown in the drawings disclosed in the Official Gazette of Japanese Examined Patent Publication No. Hei 7-40785. By the application of an input V11, magnetic energy is stored in an inductor L during a period while a switch S1 makes contact with its contact A. The magnetic energy is released to each output during a period while the switch S1 makes contact with its contact B. At that time, the magnetic energy is distributed to each output via a switch S2. The Official Gazette of Japanese Examined Patent Publication No. Hei 7-40785 discloses a method of controlling the period while the switch S2 makes contact with each contact thereof so that all the output voltages are stabilized and of controlling the switch S1 so that power is supplied to all loads just sufficiently.

An invention having a configuration based on a technical concept similar to that of the Official Gazette of Japanese Examined Patent Publication No. Hei 7-40785 but adopting a different control method has also been proposed (see U.S. Pat. No. 5,400,239, for example). U.S. Pat. No. 5,400,239 discloses an insulating flyback converter having N outputs and being characterized in that N rectifying and smoothing circuits are connected to one output winding of a transformer via a switching transistor corresponding to the switch S2 of the boost converter shown in FIG. 9. In U.S. Pat. No. 5,400,239, the switching frequency of a main switching transistor corresponding to the switch S1 is divided by N and allocated to the control of each output. In other words, the switching transistor corresponding to the switch S2 in U.S. Pat. No. 5,400,239 is switched at 1/N of the switching frequency. The ON period of the main switching transistor corresponding to the switch S1 is adjusted in each switching cycle, whereby each output voltage is controlled.

A configuration wherein an inductor is commonly used for a plurality of boost converters is obtained by applying the conventional control method disclosed in U.S. Pat. No. 5,400,239 to the conventional multi-output converter shown in FIG. 8. FIG. 10 is a circuit diagram of a boost converter having two outputs, serving as a simple application example of this configuration. FIG. 11 is a diagram. showing the waveforms of signals at the main sections of the configuration. The application example will be described below in detail.

In the boost converter having two outputs, shown in FIG. 10, an input DC voltage Ei is input from an input DC power supply 1. The boost converter comprises an inductor 2, a main switch 14, an auxiliary switch 15, a diode 11, a first output capacitor 5, a diode 12 connected in series with the auxiliary switch 15, a second output capacitor 9 and a control circuit 16. The main switch 14 and the auxiliary switch 15 are each formed of an N-MOSFET, for example. The control circuit 16 controls the main switch 14 and the auxiliary switch 15 so that they are driven in accordance with their respective predetermined ON and OFF periods.

In the boost converter having two outputs configured as described above and shown in FIG. 10, a first output voltage Vo1 is output from the first output capacitor 5 to a first load 6, and a second output voltage Vo2 is output from the second output capacitor 9 to a second load 10. The input/output conditions are represented by Vo1 >Vo2> Ei. When the auxiliary switch 15 is OFF, the inductor 2, the main switch 14, the diode 11 and the first output capacitor 5 constitute a boost converter. On the other hand, when the auxiliary switch 15 is ON, the inductor 2, the main switch 14, the diode 12 and the second output capacitor 9 constitute a boost converter.

In the control circuit 16, an output detection circuit 17 detects the first output voltage Vo1 and the second output voltage Vo2. Furthermore, the output detection circuit 17 outputs error voltages Ve1 and Ve2 respectively obtained by amplifying the error between the detected output voltage Vo1 and its desired value and by amplifying the error between the detected output voltage Vo2 and its desired value. An oscillation circuit 18 outputs a sawtooth voltage Vt and a clock signal Vt1 each having a predetermined cycle T. A PWM circuit 19 outputs a signal V1 obtained as the result of the comparison between the error voltage Ve1 and the sawtooth voltage Vt and also outputs a signal V2 obtained as the result of the comparison between the error voltage Ve2 and the sawtooth voltage Vt.

A frequency divider circuit 20 receives the signal Vt1 and outputs a frequency-divided signal Vt2. A drive circuit 21 receives the signal V1, the signal V2 and the frequency-divided signal Vt2 and outputs a drive signal Vg14 for the main switch 14 and a drive signal Vg15 for the auxiliary switch 15. Furthermore, as the drive signal Vg14 from the drive circuit 21, the signal V1 is selected and output when the frequency-divided signal Vt2 is low, and the signal V2 is selected and output when the frequency-divided signal Vt2 is high.

FIG. 11 is a diagram showing the waveforms of the various signals in the boost converter having two outputs shown in FIG. 10 and the waveform of a current IL flowing through the inductor 2.

The operation of the conventional multi-output DC-DC converter during its normal operation will be described below by using FIGS. 10 and 11.

First, it is assumed that at time t0 in FIG. 11, the frequency-divided signal Vt2 is driven low by the clock signal Vt1 and the sawtooth voltage Vt starts rising. At this time, the frequency-divided signal Vt2, that is, the drive signal Vg15, is low, whereby the auxiliary switch 15 becomes OFF. On the other hand, the signal V1 obtained as the result of the comparison between the sawtooth voltage Vt and the error voltage Ve1 becomes high, and this signal is output as the drive signal Vg14. In other words, the main switch 14 becomes ON, the input DC voltage Ei is applied to the inductor 2, and magnetic energy is stored.

When the signal V1 becomes low at time t1, the drive signal Vg14 becomes low, and the main switch 14 becomes OFF. At this time, the magnetic energy stored in the inductor 2 is released as a current for charging the capacitor 5 via the diode 11 since the auxiliary switch 15 is OFF. This current decreases and becomes zero soon.

At time t2, the frequency-divided signal Vt2 is driven high by the clock signal Vt1, and the sawtooth voltage Vt lowers abruptly and then starts rising again. At this time, the drive signal Vg15 becomes high, and the auxiliary switch 15 becomes ON. On the other hand, the signal V2 obtained as the result of the comparison between the sawtooth voltage Vt and the error voltage Ve2 becomes high and is output as the drive signal Vg14. In other words, the main switch 14 becomes ON. At this time, the input DC voltage Ei is applied to the inductor 2, and magnetic energy is stored.

When the signal V2 becomes low at time t3, the drive signal Vg14 becomes low, and the main switch 14 becomes OFF. At this time, the magnetic energy stored in the inductor 2 is released as a current for charging the capacitor 9 via the diode 12 since the auxiliary switch 15 is ON. This current decreases and becomes zero soon.

At time t4, the drive signal Vg15 becomes low, and the operation at time t0 and thereafter is repeated.

The following equations (1) and (2) are established assuming that the inductance of the inductor 2 is L, that the ON period of the main switch 14 while the auxiliary switch 15 is OFF is Ton1, that the ON period of the main switch 14 while the auxiliary switch 15 is ON is Ton2, that the output current to the first load 6 is Io1, and that the output current to the second load 10 is Io2.

$$Vo1 = Ei + \frac{(Ei \cdot Ton1)^2}{4L \cdot T \cdot Io1} \quad (1)$$

$$Vo2 = Ei + \frac{(Ei \cdot Ton2)^2}{4L \cdot T \cdot Io2} \quad (2)$$

In the conventional boost converter having two outputs, configured as described above, the error voltages Ve1 and Ve2 change so that the first and second output voltages Vo1 and Vo2 are stabilized to their respective desired voltages, whereby the ON period of the main switch 14 is adjusted. In other words, the two boost converters wherein the main switch 14 and the inductor 2 are commonly used are subjected to time-sharing control at half the oscillation frequency of the oscillation circuit 18. Hence, the first and second output voltages Vo1 and Vo2 are stabilized to their respective desired voltages.

As described above, the conventional multi-output DC-DC converter shown in FIG. 8 had a problem of causing a loss due to the series regulator and thereby having low conversion efficiency. In addition, since the conventional multi-output DC-DC converter shown in FIG. 8 used a configuration comprising a plurality of switching converters, such as boost converters, to obtain multiple outputs, the number of components increased, whereby an apparatus incorporating such converters was made larger in size and higher in cost.

On the other hand, in the configuration of the conventional multi-output DC-DC converter shown in FIG. 9, the number of components is decreased by commonly using the inductor, whereby a plurality of outputs can be controlled at high efficiency. In the configuration of the conventional multi-output DC-DC converter shown in FIG. 9, in the case of the control method disclosed in the Official Gazette of Japanese Examined Patent Publication No. Hei 7-40785, the magnetic energy is stored in the inductor L during a period while the switch S1 makes contact with its contact A. This magnetic energy is distributed to each output by the switching operation of the switch S2 during a period while the switch S1 makes contact with its contact B. However, for example, in the case of the converter having three outputs shown in FIG. 9, when the above-mentioned control method is Used, it is necessary to control four periods in one switching cycle of the switch S1. The four periods are a period while the switch S1 makes contact with its contact A, a period while the switch S1 makes contact with its contact B and the switch S2 distributes the magnetic energy to a first output, a period while the switch S1 makes contact with its contact B and the switch S2 distributes the magnetic energy to a second output, and a period while the switch S1 makes contact with its contact B and the switch S2 distributes the magnetic energy to a third output. A switching converter can be made smaller by raising its switching frequency. However, in the method of controlling the above-mentioned four periods, it was difficult to raise the switching frequency. Furthermore, there was a problem of causing switching losses and switching noise during the switching operation of the switch S2.

The above-mentioned problem of being difficult to raise the switching frequency can be solved, just as in the case of the converter disclosed in U.S. Pat. No. 5,400,239, more specifically, by applying the control method wherein the switching frequency is divided and assigned to the control of each output. This is described above by taking the boost converter having two outputs as an example and by using. FIGS. 10 and 11. However, in the conventional converter configured as shown in FIG. 10, the current flowing through the inductor 2 did not become zero in some cases during the OFF period of the main switch 14. In a converter, the current flowing through the inductor 2 is desired to be zero during the OFF period of the main switch 14 because of the following reason.

For example, in the multi-output DC-DC converter shown in FIG. 10, in the case when the first output current Io1 is large and the current flowing through the diode 11 does not become zero during the OFF period of the main switch 14, the current IL flowing through the inductor 2 has the waveform shown in FIG. 12. At this time, the output voltages Vo1 and Vo2 are represented by the following equations (3) and (4).

$$Vo1 = \frac{T + Ton1}{T - Ton1} \cdot Ei - \frac{4L \cdot T \cdot Io1}{(T - Ton1)^2} \quad (3)$$

$$Vo2 = Ei + \frac{\{(T + Ton2) \cdot Ei - (T - Ton1) \cdot Vo1\}^2}{4L \cdot T \cdot Io2} \quad (4)$$

The first output voltage Vo1 can be controlled by adjusting the ON period Ton1 in accordance with the change of the output current Io1. However, since the current flowing through the diode 11 does not become zero during the OFF period of the main switch 14, there is a restriction represented by $Vo1 < Ei \cdot T/(T-Ton1)$. Hence, even when Ton2=0, the numerator of the second term in Equation (4) for obtaining the second output voltage Vo2 has a value larger than zero. Therefore, in the case when the output current Io2 is small, the second output voltage Vo2 rises and becomes uncontrollable. At the time of starting when the output has not risen sufficiently or when one of the outputs is overloaded and the voltage of the output lowers, the current flowing through the inductor 2 does not become zero during the OFF period of the main switch 14. In other words, the phenomenon shown in FIG. 12 occurs as a problem.

SUMMARY OF THE INVENTION

By dividing a switching frequency and by controlling a plurality of outputs, the present invention is intended to provide a highly reliable multi-output DC-DC converter comprising highly efficient switching converters configured so that the number of components is reduced by using an inductor in common, and preventing the output voltages from being raised by the magnetic energy remaining in the inductor and from becoming uncontrollable at the time of starting or overload.

In order to attain the above-mentioned object, the multi-output DC-DC converter in accordance with the present invention comprises first to nth (n: an integer of 2 or more) output circuits for receiving an input DC voltage and for outputting first to nth output DC voltages, a switching circuit, an inductor and a control circuit, wherein
  the switching circuit has an ON state, in which the input DC voltage is applied to the inductor and magnetic energy is stored, and has first to nth OFF states, in which the magnetic energy is released to one of the first to nth output circuits,
  the control circuit is configured to distribute the switching cycles of the switching circuit to first to nth outputs to be controlled and to detect the first to nth output DC voltages, and further configured, in the case when one switching cycle of the switching circuit is used to control a kth ($1 \leq k \leq n$) output, to select a kth OFF state after the period of the ON state is adjusted so that the kth output DC voltage becomes a predetermined value and to maintain the kth OFF state until the release of the magnetic energy stored in the inductor to the kth output circuit is completed. By dividing the switching frequency and by controlling the plurality of outputs, the multi-output DC-DC converter in accordance with the present invention configured as described above can comprise highly efficient switching converters configured so that the number of components is reduced by using the inductor in common. Furthermore, the multi-output DC-DC converter prevents the output voltages from being raised by the magnetic energy remaining in the inductor and from becoming uncontrollable at the time of starting or overload. Still further, the multi-output DC-DC converter in accordance with the present invention is configured so that the operation shifts to the next cycle after the current flowing through the inductor becomes zero within one switching cycle. Hence, it is possible to avoid an overvoltage condition due to the occurrence that the current flowing through the inductor does not become zero within one switching cycle.

The multi-output DC-DC converter in accordance with the present invention, may be configured so that the control circuit is configured to shift the kth OFF state to the ON state after the release of the magnetic energy stored in the inductor to the kth output circuit is completed.

Further, the multi-output DC-DC converter in accordance with the present invention may be configured so that the switching cycle of the switching circuit or the period from the first to nth OFF state is not smaller than a predetermined value.

The multi-output DC-DC converter in accordance with another aspect of the present invention comprises first to nth (n: an integer of 2 or more) output circuits for receiving an input DC voltage and for outputting first to nth output DC voltages, a switching circuit, an inductor and a control circuit, wherein
  the switching circuit has an ON state, in which the input DC voltage is applied to the inductor and magnetic energy is stored, and has first to nth OFF states, in which the magnetic energy is released to one of the first to nth output circuits,
  the control circuit is configured to distribute the switching cycles of the switching circuit to first to nth outputs to be controlled and to detect the first to nth output DC voltages, and further configured, in the case when one switching cycle of the switching circuit is used to control a kth ($1 \leq k \leq n$) output, to select a kth OFF state after the period of the ON state is adjusted so that the kth output DC voltage becomes a predetermined value and to select an OFF state other than the kth OFF state when the kth output DC voltage exceeds a predetermined upper limit value. By dividing the switching frequency and by controlling the plurality of outputs, the multi-output DC-DC converter in accordance with the present invention configured as described above can comprise highly efficient switching converters configured so that the number of components is reduced by using the inductor in common. Furthermore, the multi-output DC-DC converter prevents the output voltages from being raised by the magnetic energy remaining in the inductor and from becoming uncontrollable at the time of starting or overload. Still further, in the multi-output DC-DC converter in accordance with the present invention, since the switching cycle is fixed, the current flowing through the inductor does not become zero within one switching cycle in some cases. However, the resulting overvoltage condition is detected, and the current is released to the other output. Therefore, it is possible to avoid the overvoltage condition.

Furthermore, the multi-output DC-DC converter in accordance with the present invention may be configured so that the operation is stopped when all the 1st to nth output DC voltages exceed their upper limit values having been set respectively.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of a multi-output DC-DC converter in accordance with the present invention will be described below referring to the accompanying drawings.

<<Embodiment 1>>

Figure 1:
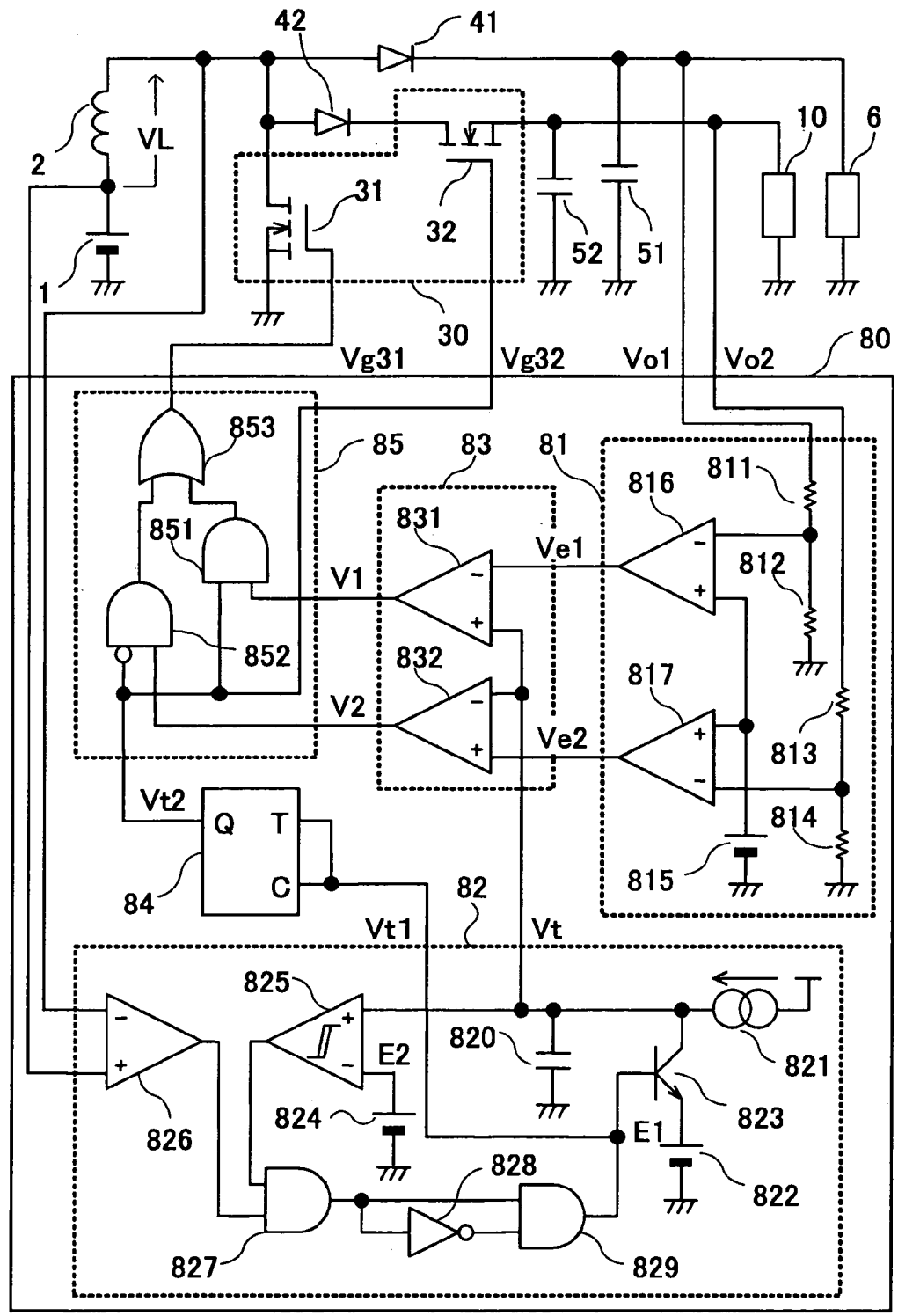
FIG. 1 is a circuit diagram showing the configuration of a multi-output DC-DC converter in accordance with Embodiment 1 of the present invention.

FIG. 1 is a circuit diagram showing the configuration of a multi-output DC-DC converter in accordance with Embodiment 1 of the present invention. As shown in FIG. 1, in the multi-output DC-DC converter in accordance with Embodiment 1 of the present invention, an input DC voltage Ei is input from an input DC power supply 1. The multi-output DC-DC converter comprises an inductor 2, a switching circuit 30, a diode 41, a diode 42, a first output capacitor 51, a second output capacitor 52 and a control circuit 80.

The switching circuit 30 comprises a main switch 31 and an auxiliary switch 32. Each of the switches is formed of an N-MOSFET, for example. The diode 42 is connected in series with the auxiliary switch 32. The control circuit 80 controls the main switch 31 and the auxiliary switch 32 so that they are driven in accordance with their respective predetermined ON and OFF periods.

In the multi-output DC-DC converter in accordance with Embodiment 1, a first output voltage Vo1 is output from the first output capacitor 51 to a first load 6, and a second output voltage Vo2 is output from the second output capacitor 52 to a second load 10. The input/output conditions are represented by Vo1>Vo2>Ei.

The ON state of the switching circuit 30 comprising the main switch 31 and the auxiliary switch 32 is a state wherein the main switch 31 is ON and the input DC voltage Ei is applied to the inductor 2. At this time, the ON/OFF state of the auxiliary switch 32 is not considered. The first OFF state of the switching circuit 30 is a state wherein the main switch 31 is OFF and the auxiliary switch 32 is OFF. In the case when the auxiliary switch 32 is OFF as described above, the inductor 2, the main switch 31, the diode 41 and the capacitor 51 constitute a boost converter (step-up converter). The second OFF state of the switching circuit 30 is a state wherein the main switch 31 is OFF and the auxiliary switch 32 is ON. In the case when the auxiliary switch 32 is ON as described above, the inductor 2, the main switch 31, the diode 42 and the capacitor 52 constitute a boost converter (step-up converter).

As shown in FIG. 1, the control circuit 80 in accordance with Embodiment 1 comprises an output detection circuit 81, an oscillation circuit 82, a pulse width modulation circuit (hereafter referred to as a PWM circuit) 83, a frequency divider circuit 84 and a drive circuit 85.

The output detection circuit 81 of the control circuit 80 comprises resistors 811 and 812 for detecting the first output voltage Vo1, resistors 813 and 814 for detecting the second output voltage Vo2, a reference voltage source 815, an error amplifier 816 for amplifying the error between the detection voltage of the first output voltage Vo1 and the voltage of the reference voltage source 815, and an error amplifier 817 for amplifying the error between the detection voltage of the second output voltage Vo2 and the voltage of the reference voltage source 815. The output detection circuit 81 outputs an error voltage-Ve1 from the error amplifier 816 and outputs an error voltage Ve2 from the error amplifier 817.

The oscillation circuit 82 of the control circuit 80 comprises an oscillation capacitor 820 for outputting an oscillation voltage Vt, a constant-current source 821 for charging the oscillation capacitor 820, a voltage source 822 for outputting a voltage E1, a transistor 823 connected between the goscillation capacitor 820 and the voltage source 822, a voltage source 824 for outputting an voltage E2, a comparator 825 for comparing the oscillation voltage Vt with the voltage E2, a comparator 826 to which the voltage VL across the inductor 2 is input, an AND gate 827 to which the output of the comparator 825 and the output of the comparator 826 are input, and an AND gate 829 to which the output of the AND gate 827 and the output of an inverter 828, the inversion of the output of the AND gate 827, are input. When the output of the AND gate 827 becomes high, the AND gate 829 outputs a one-shot pulse signal serving as a clock signal Vt1. The clock signal Vt1 turns ON the transistor 823 for a short time, whereby the oscillation capacitor 820 is short-circuited and discharged to the voltage E1. When the transistor 823 is turned OFF, the oscillation capacitor 820 is charged by the constant current of the constant-current source 821. The clock signal Vt1 is generated when the oscillation capacitor 820 is charged to the voltage E2 or higher and when the voltage VL of the inductor 2 is zero or lower. The comparator 825 has a hysteresis characteristic. It is thus assumed that after the oscillation voltage Vt has risen to the voltage E2 or higher and the output of the comparator 825 has become high, the output of the comparator 825 does not become low unless the oscillation voltage Vt becomes lower than the voltage E2. In other words, the oscillation voltage Vt abruptly lowers to the voltage E1 when the clock signal Vt1 is generated and then rises linearly, thereby having a sawtooth waveform.

The PWM circuit 83 of the control circuit 80 comprises a comparator 831 for comparing the error voltage Ve1 with the oscillation voltage Vt and for outputting a signal V1, and a comparator 832 for comparing the error voltage Ve2 with the oscillation voltage Vt and for outputting a signal V2. The signal V1 becomes high when the oscillation voltage Vt is not higher than the error voltage Ve1, and the signal V2 becomes high when the oscillation voltage Vt is not higher than the error voltage Ve2.

The frequency divider circuit 84 of the control circuit 80 receives the clock signal Vt1 and outputs a frequency-divided signal Vt2. The drive circuit 85 comprises an AND gate 851 to which the signal V1 and the frequency-divided signal Vt2 are input, an AND gate 852 to which the signal V2 and the inverted signal of the frequency-divided signal Vt2 are input, and an OR gate 853 to which the output of the AND gate 851 and the output of the AND gate 852 are input. The OR gate 853 outputs a drive signal Vg31 for the main switch 31. The frequency-divided signal Vt2 is output as a drive signal Vg32 for the auxiliary switch 32. Hence, when the frequency-divided signal Vt2 is low, the signal V1 is selected and output as the drive signal Vg31. When the frequency-divided signal Vt2 is high, the signal V2 is selected and output as the drive signal Vg31.

Figure 2:
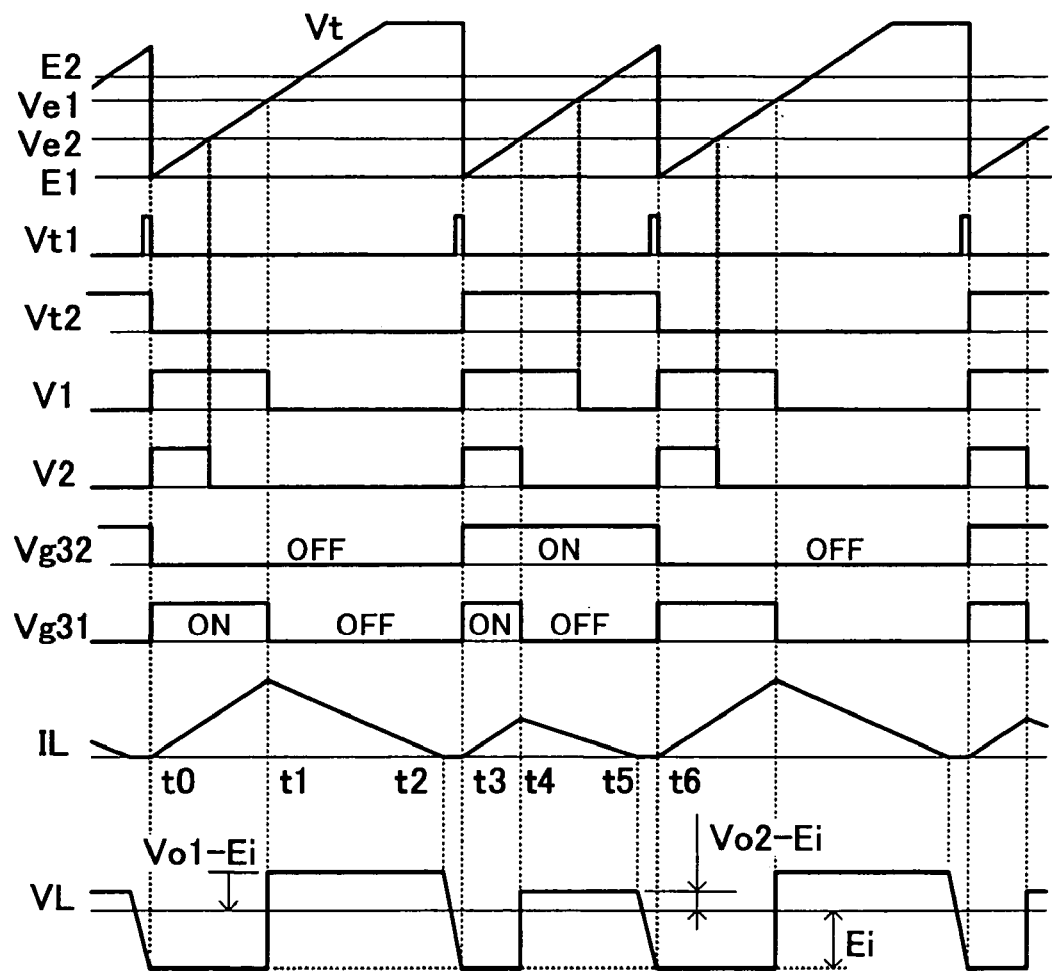
FIG. 2 is a waveform diagram showing the operation of the multi-output DC-DC converter in accordance with Embodiment 1 of the present invention.

FIG. 2 is a diagram showing the waveforms of the various signals generated in the control circuit 80, the current IL flowing through the inductor 2 and the voltage VL across the inductor 2, in Embodiment 1 configured as described above.

The operation of the multi-output DC-DC converter in accordance with Embodiment 1 of the present invention will be described below by using FIGS. 1 and 2.

First, it is assumed that at time t0 in FIG. 2, the frequency-divided signal Vt2, that is, the drive signal Vg32, is driven low by the clock signal Vt1, whereby the auxiliary switch 32 becomes OFF and the oscillation voltage Vt starts rising. The signal V1 obtained as the result of the comparison between the oscillation voltage Vt and the error voltage Ve1 is selected as the drive signal Vg31. Since the drive signal Vg31 is high, the main switch 31 becomes ON (the switching circuit 30 becomes ON), whereby the input DC voltage Ei is applied to the inductor 2 and magnetic energy is stored.

When the rising oscillation voltage Vt and the error voltage Ve1 intersect with each other at time t1, the signal V1 and the drive signal Vg31 become low, whereby the main switch 31 becomes OFF. At this time, the magnetic energy stored in the inductor 2 is released as a current for charging the capacitor 51 via the diode 41 since the auxiliary switch 15 is OFF (the switching circuit 30 is in its first OFF state). At this time, the voltage (Vo1−Ei), that is, the difference between the first output voltage Vo1 and the input DC voltage Ei, is applied as the voltage VL of the inductor 2 in the case when the forward voltage drop of the diode 41 is neglected. Then, the oscillation voltage Vt rises continuously, exceeds the voltage E2 and stops rising soon since the constant-current source 821 is saturated.

On the other hand, the current IL of the inductor 2 decreases and becomes zero soon at time t2. At this time, the voltage VL of the inductor 2 starts free oscillation and lowers from the voltage (Vo1−Ei).

When the voltage VL of the inductor 2 becomes zero at time t3, the clock signal Vt1 is generated, and the frequency-divided signal Vt2 becomes high, whereby the oscillation voltage Vt lowers abruptly to the voltage E1 and then starts rising again. At this time, the drive signal Vg32 also becomes high, and the auxiliary switch 32 becomes ON. On the other hand, the signal V2 obtained as the result of the comparison between the oscillation voltage Vt and the error voltage Ve2 becomes high. This signal is selected and output as the drive signal Vg31. Hence, the main switch 31 becomes ON (the switching circuit 30 becomes ON), whereby the input DC voltage Ei is applied to the inductor 2 and magnetic energy is stored.

When the rising oscillation voltage Vt and the error voltage Ve2 intersect with each other at time t4, the signal V2 and the drive signal Vg31 become low, whereby the main switch 31 becomes OFF. At this time, the magnetic energy stored in the inductor 2 is released as a current for charging the capacitor 52 via the diode 42 since the auxiliary switch 32 is ON (the switching circuit 30 is in its second OFF state). At this time, the voltage (Vo2−Ei), that is, the difference between the second output voltage Vo2 and the input DC voltage Ei, is applied as the voltage VL of the inductor 2 in the case when the forward voltage drop of the diode 42 is neglected. Then, the oscillation voltage Vt rises continuously and exceeds the voltage E2.

On the other hand, the current IL of the inductor 2 decreases and becomes zero soon at time t5. At this time, the voltage VL of the inductor 2 starts free oscillation and lowers from the voltage (Vo2−Ei). The voltage VL decreases and becomes zero soon.

When the voltage VL of the inductor 2 becomes zero at time t6, the clock signal Vt1 is generated, and the frequency-divided signal Vt2 becomes low, whereby the oscillation voltage Vt lowers abruptly to the voltage E1 and then starts rising again. In other words, after time t6, the operation at time t0 and thereafter is repeated.

It is assumed that the inductance of the inductor 2 is L, that the ON period of the main switch 31 while the auxiliary switch 32 is OFF is Ton1, that the OFF period of the main switch 31 while the auxiliary switch 32 is OFF is Toff1, that the ON period of the main switch 31 while the auxiliary switch 32 is ON is Ton2, and that the OFF period of the main switch 31 while the auxiliary switch 32 is ON is Toff2. In addition, it is assumed that the output current to the first load 6 is Io1, and that the output current to the second load 10 is Io2. Furthermore it is assumed that the forward voltage drops of the diodes 41 and 42 are neglected, and that transient periods between time t2 and t3 and between time t5 and t6 are neglected since these periods are shorter than the other periods. On the basis of these assumptions, the following equations (5) and (6) are established.

$$Vo1 = Ei + \frac{Ton1}{Ton1+Ton2} \cdot \frac{Ei}{Io1} \cdot \left(\frac{Ei \cdot Ton1}{2L} - Io1 - \frac{Ton1}{Ton2} \cdot Io2\right) \quad (5)$$

$$Vo2 = Ei + \frac{Ton2}{Ton1+Ton2} \cdot \frac{Ei}{Io2} \cdot \left(\frac{Ei \cdot Ton2}{2L} - Io2 - \frac{Ton2}{Ton1} \cdot Io1\right) \quad (6)$$

The error voltages Ve1 and Ve2 change so that the first and second output voltages Vo1 and Vo2 are stabilized to their respective desired voltages, whereby the ON period of the main switch 31 is adjusted. In other words, in the multi-output DC-DC converter in accordance with Embodiment 1, the two boost converters wherein the main switch 31 and the inductor 2 are commonly used are subjected to time-sharing control. Hence, the first and second output voltages Vo1 and Vo2 are stabilized to their respective desired voltages.

In the multi-output DC-DC converter in accordance with Embodiment 1, the clock signal Vt1 is generated only when the voltage VL of the inductor 2 becomes zero or less. This indicates that the clock signal Vt1 is generated after the magnetic energy stored in the inductor 2 is released as a current and lost. Hence, no magnetic energy remains in the inductor 2 even at the time of starting or overload. Therefore, output voltage rising to an uncontrollable level is securely avoided in the multi-output DC-DC converter in accordance with Embodiment 1.

Figure 3:
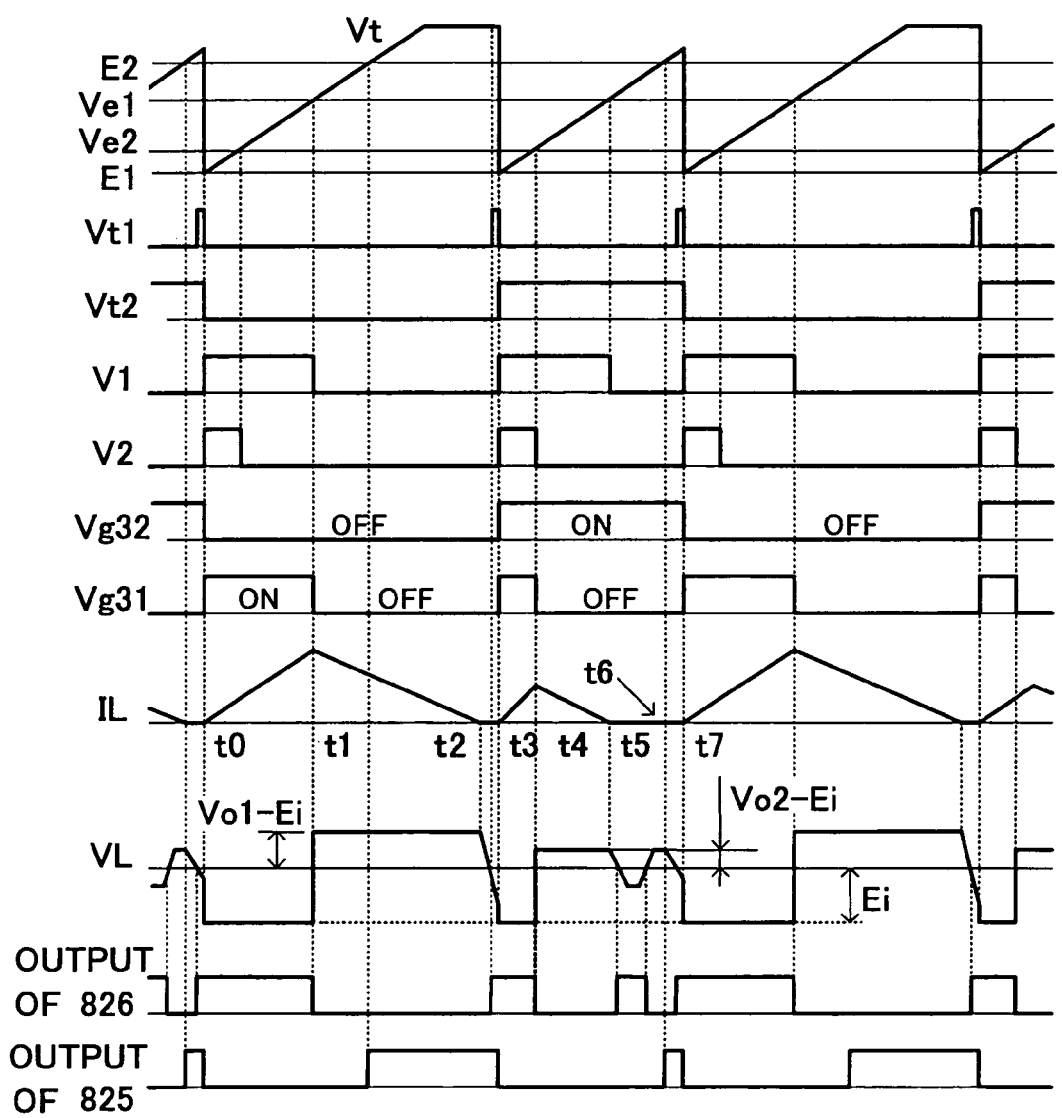
FIG. 3 is a waveform diagram showing the operation of the multi-output DC-DC converter in accordance with Embodiment 1 of the present invention.

In Embodiment 1, when the second load 10 is reduced for example, the second output current Io2 decreases. As the second output current Io2 decreases, the switching cycle assigned to the control of this output becomes shorter. FIG. 3 is a diagram showing the waveforms of the signals of the various sections during operation at the time when the second load 10 is reduced. FIG. 3 also shows the waveforms of the outputs of the comparators 825 and 826 in addition to the waveforms of the signals of the various sections, shown in FIG. 2.

The operation at the time when the second load 10 is reduced will be described below by using FIGS. 1 and 3.

Since the operations of the various sections in the period from time t0 to t3 are the same as those shown in FIG. 2 described above, they are not described herein. When the rising oscillation voltage Vt and the error voltage Ve2 intersect with each other at time t4, the main switch 31 becomes OFF. Hence, the magnetic energy stored in the inductor 2 is released as a current for charging the capacitor 52 via the diode 42.

On the other hand, the current of the inductor 2 decreases and becomes zero soon at time t5. When the current of the inductor 2 becomes zero, the voltage Vt across the inductor 2 starts free oscillation. This voltage VL lowers from the voltage (Vo2−Ei) and becomes zero soon, whereby the output of the comparator 826 becomes high. However, since the oscillation voltage Vt does not reach the voltage E2 at this time, the output of the comparator 825 is low, whereby the clock signal Vt1 remains low. By the free oscillation of the voltage VL, the output of the comparator 826 becomes high and low repeatedly.

At time t6, the oscillation voltage Vt reaches the voltage E2, and the output of the comparator 825 becomes high. When the output of the AND gate 826 becomes high after this, a one-shot pulse signal is generated as the clock signal Vt1. At time t7, the frequency-divided signal Vt2 becomes low, whereby the oscillation voltage Vt lowers abruptly to the voltage E1 and then starts rising again. In other words, after time t7, the operation at time t0 and thereafter is repeated.

In the multi-output DC-DC converter in accordance with Embodiment 1 of the present invention, as the second output current Io2 decreases owing to the reduction of the load 10, the switching cycle assigned to this output control becomes shorter. However, as described above, the multi-output DC-DC converter in accordance with Embodiment 1 is configured so that the clock signal Vt1 for starting the next switching cycle is not generated while the oscillation capacitor 820 is charged from the voltage E1 to the voltage E2. In other words, in the multi-output DC-DC converter in accordance with Embodiment 1, the switching cycle is set at a minimum period.

<<Embodiment 2>>

A multi-output DC-DC converter in accordance with Embodiment 2 of the present invention will be described below by using FIGS. 4 and 5.

Figure 4:
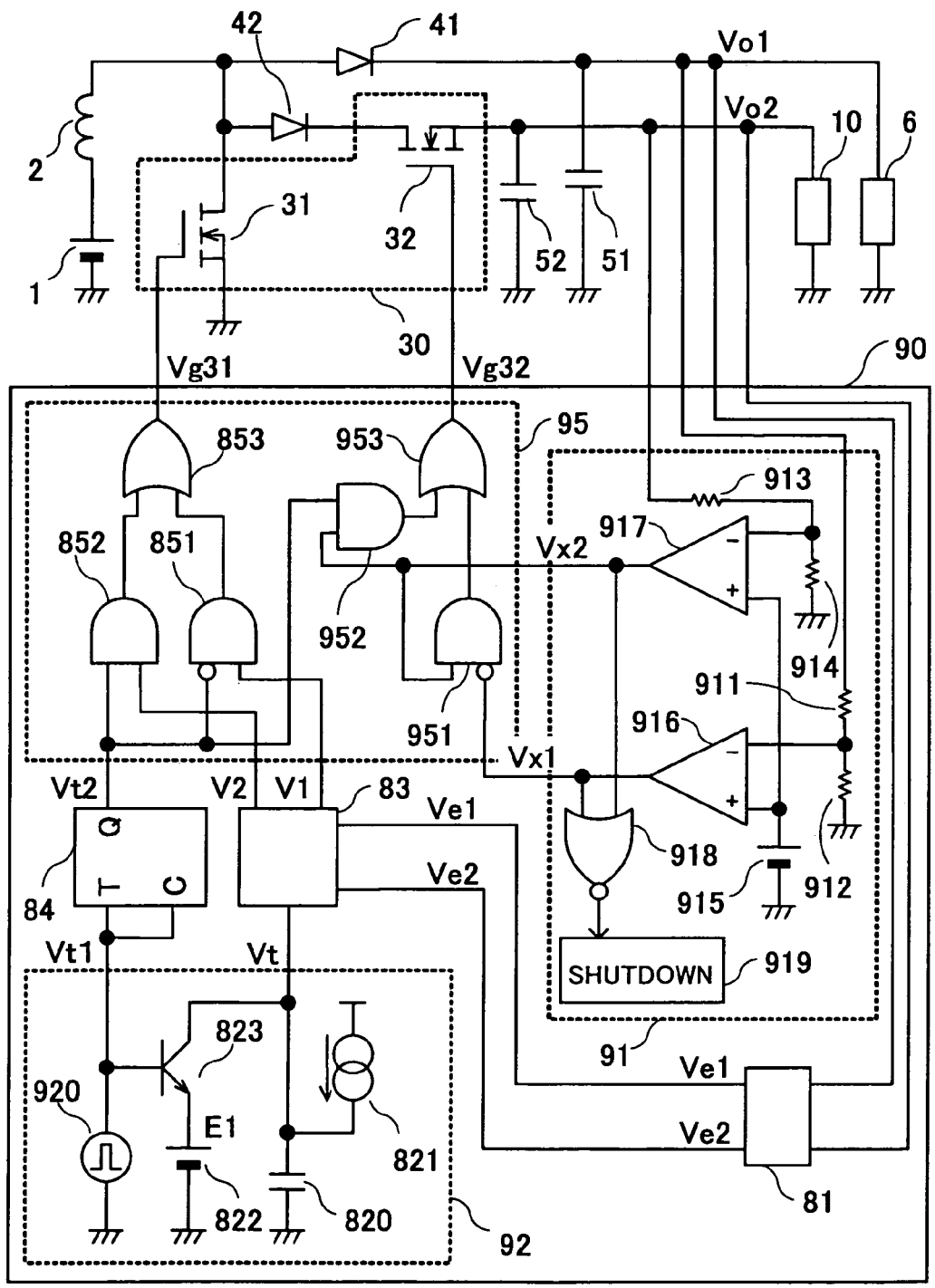
FIG. 4 is a circuit diagram showing the configuration of a multi-output DC-DC converter in accordance with Embodiment 2 of the present invention.

FIG. 4 is a circuit diagram showing the configuration of the multi-output DC-DC converter in accordance with Embodiment 2 of the present invention. The input DC power supply 1, the inductor 2, the switching circuit 30 comprising the main switch 31 and the auxiliary switch 32, the diode 41, the first output capacitor 51, the diode 42 and the second output capacitor 52 described in the explanations of the above-mentioned Embodiment 1 are substantially the same as those of Embodiment 2 with respect to functions and configurations. Hence, they are designated by the same numerals, and their detailed explanations are omitted. The multi-output DC-DC converter in accordance with Embodiment 2 differs from the multi-output DC-DC converter in accordance with Embodiment 1 in the configuration and operation of a control circuit 90 for controlling the main switch 31 and the auxiliary switch 32 so that they are driven in accordance with their respective predetermined ON and OFF periods.

The output detection circuit 81, the PWM circuit 83 and the frequency divider circuit 84 of the control circuit 90 are the same as those of the multi-output DC-DC converter in accordance with Embodiment 1 shown in FIG. 1 with respect to functions and configurations. Hence, they are designated by the same numerals, and their detailed explanations are omitted. The control circuit 90 differs from the control circuit 80 in accordance with Embodiment 1 in that an overvoltage protection circuit 91 is added and that an oscillation circuit 92 and a drive circuit 95 respectively differ from the oscillation circuit 82 and the drive circuit 85 of Embodiment 1 in configuration.

The overvoltage protection circuit 91 of the control circuit 90 comprises two resistors 911 and 912 for detecting the first output voltage Vo1, two resistors 913 and 914 for detecting the second output voltage Vo2, a voltage source 915, a comparator 916 for comparing the detection voltage of the first output voltage Vo1 with the voltage of the voltage source 915, and a comparator 917 for comparing the detection voltage of the second output voltage Vo2 with the voltage of the voltage source 915. A signal Vx1 is output from one of the comparators, that is, the comparator 916, and a signal Vx2 is output from the other comparator, that is, the comparator 917. The overvoltage protection circuit 91 further comprises a NOR gate 918 to which the signals Vx1 and Vx2 are input, and a shutdown circuit 919 to which the output of this NOR gate 918 is input. When the first output voltage Vo1 gets into an overvoltage condition, the signal Vx1 becomes low. When the second output voltage Vo2 gets into an overvoltage condition, the signal Vx2 becomes low. Furthermore, when both the first output voltage Vo1 and the second output voltage Vo2 get into overvoltage conditions, the output of the NOR gate 918 becomes high, and the shutdown circuit 919 is operated. When the shutdown circuit 919 is operated, the control circuit 90 stops its operation. The operation is not resumed unless the input DC voltage Ei lowers sufficiently.

The oscillation circuit 92 has a signal source 920 for generating a clock signal Vt1 having a predetermined cycle T. The oscillation circuit 92 is configured so that the oscillation capacitor 820 is charged by the constant current of the constant-current source 821 and discharged by a transistor 823 that is turned ON/OFF by the clock signal Vt1. The oscillation capacitor 820 having been charged is short-circuited by the transistor 823 and discharged to the voltage E1 of a voltage source 822. In other words, the oscillation circuit 92 is configured so as to output the clock signal Vt1 and an oscillation voltage Vt having a sawtooth oscillation waveform synchronized with this clock signal Vt1.

The AND gate 851, the AND gate 852 and the OR gate 853 of the drive circuit 95 are the same as those of the drive circuit 85 of the control circuit 80 of the multi-output DC-DC converter in accordance with Embodiment 1 with respect to configuration. Hence, when the frequency-divided signal Vt2 is low, the signal V1 is selected and output as the drive signal Vg31. When the frequency-divided signal Vt2 is high, the signal V2 is selected and output as the drive signal Vg31. The selection and output carried out as described above are the same as those in the case of the multi-output DC-DC converter in accordance with Embodiment 1.

The drive circuit 95 in accordance with Embodiment 2 differs from the drive circuit 85 in accordance with Embodiment 1 as described below. The drive circuit 95 is additionally provided with an AND gate 951 to which the inverted signal of the signal Vx1 and the signal Vx2 are input, an AND gate 952 to which the signal Vx2 and the signal Vt2 are input, and an OR gate 953 to which the output of the AND gate 951 and the output of the AND gate 952 are input. Furthermore, in Embodiment 2, the output of the OR gate 953 is output as the drive signal Vg32 for the auxiliary switch 32.

The operation of the multi-output DC-DC converter in accordance with Embodiment 2 of the present invention will be described below.

First, the operation of the multi-output DC-DC converter during its normal operation wherein both the first output voltage Vo1 and the second output voltage Vo2 are not in overvoltage conditions will be described below. In the case of this normal operation, both the signals Vx1 and Vx2 are high. Hence, in the drive circuit 95, the output of the AND gate 951 is low, and the output of the AND gate 952 is the frequency-divided signal Vt2. The OR of these, serving as the drive signal Vg32, is the frequency-divided signal Vt2. Therefore, the operation of the control circuit 90 is similar to the operation of the control circuit 80 of the multi-output DC-DC converter in accordance with the above-mentioned Embodiment 1, except that the clock signal Vt1 is set at a predetermined cycle T. In other words, the switching cycle during the normal operation of the multi-output DC-DC converter in accordance with Embodiment 2 is set at T. Except for this, the fundamental operations are similar to those of the multi-output DC-DC converter in accordance with the above-mentioned Embodiment 1.

Next, for example, the operation in the case when the first load 6 is increased and the first output current Io1 is in an overcurrent condition will be described below.

In this case, a phenomenon occurs wherein the current flowing through the inductor 2 does not become zero within the switching cycle assigned to the control of the first output voltage Vo1. The magnetic energy not released but remaining in the inductor 2 is released as a current for charging the capacitor 52 in the second OFF state in the next switching cycle. If the average value of this release current is larger than the current consumed by the second load 10, the second output voltage Vo2 becomes uncontrollable and rises, whereby the second output voltage Vo2 gets into an overvoltage condition.

When the second output voltage Vo2 gets into the overvoltage condition, the comparator 917 is inverted, and the signal Vx2 becomes low. On the other hand, the signal Vx1 remains high at this time. In the drive circuit 95, both the outputs of the AND gate 951 and the AND gate 952 are low, whereby the OR of these, serving as the drive signal Vg32, is low. In other words, the auxiliary switch 32 becomes OFF (the first OFF state of the switching circuit 30) regardless of the state of the frequency-divided signal Vt2. The current flowing through the inductor 2 is released to the circuit through which the first output current Io1 being in an overcurrent condition flows, whereby the overvoltage condition of the second output voltage Vo2 is avoided.

Next, the operation in the case when the second load 10 is increased and the second output current Io2 is in an overcurrent condition will be described below.

In this case, a phenomenon occurs wherein the current flowing through the inductor 2 does not become zero within the switching cycle assigned to the control of the second output voltage Vo2. The magnetic energy not released but remaining in the inductor 2 is released as a current for charging the capacitor 51 in the first OFF state in the next switching cycle. If the average value of this release current is larger than the current consumed by the first load 6, the first output voltage Vo1 becomes uncontrollable and rises, whereby the first output voltage Vo1 gets into an overvoltage condition.

When the first output voltage Vo1 gets into the overvoltage condition, the comparator 916 is inverted, and the signal Vx1 becomes low. On the other hand, the signal Vx2 remains high at this time. In the drive circuit 95, the output of the AND gate 951 is high, whereby the drive signal Vg32 is also high. In other words, the auxiliary switch 32 becomes ON (the second OFF state of the switching circuit 30) regardless of the state of the frequency-divided signal Vt2. The current flowing through the inductor 2 is released to the circuit through which the second output current Io2 being in an overcurrent condition flows, whereby the overvoltage condition of the first output voltage Vo1 is avoided.

Figure 5:
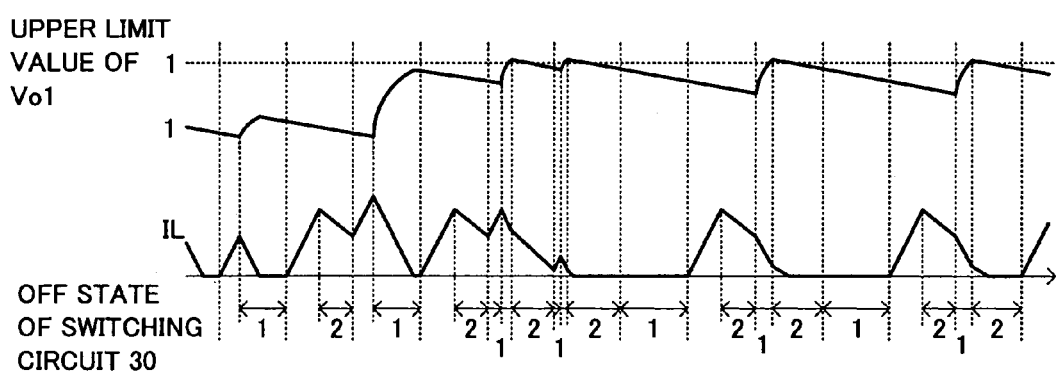
FIG. 5 is a waveform diagram showing the operation of the multi-output DC-DC converter in accordance with Embodiment 2 of the present invention.

FIG. 5 is a waveform diagram showing how the overvoltage condition of the first output voltage Vo1 is avoided. Each time the first output voltage Vo1 reaches its upper limit value at which the signal Vx becomes low, the switching circuit 30 is shifted from the first OFF state to the second OFF state. By this operation of the switching circuit 30, the first output voltage Vo1 does not exceed the upper limit value, whereby its overvoltage condition is avoided.

As described above, in the multi-output DC-DC converter in accordance with Embodiment 2, even if the current flowing through the inductor 2 does not become zero within one switching cycle and an output voltage rises and becomes uncontrollable at the time of starting or overload, the overvoltage condition is detected, and the magnetic energy remaining in the inductor 2 is released to the other output. The multi-output DC-DC converter in accordance with Embodiment 2 configured as described above can securely avoid the overvoltage condition at the time of starting or overload.

The problem wherein an output voltage rises and becomes uncontrollable may be caused by wire breakage in the output detection circuit 81 of the control circuit 90, for example. Therefore, as shown in FIG. 4, the output detection circuit 81 and the overvoltage protection circuit 91 are respectively provided with individual detection lines, although these circuits detect the same output voltages. Furthermore, in the above-mentioned uncontrollable condition owing to the abnormality in the control circuit 90, all the outputs get into overvoltage conditions, and the output of the NOR gate 918 of the overvoltage protection circuit 91 becomes high. Hence, the shutdown circuit 919 operates to stop the operation of the converter itself, thereby ensuring safety.

<<Embodiment 3>>

A multi-output DC-DC converter in accordance with Embodiment 3 of the present invention will be described below by using FIGS. 6, 7A and 7B.

Figure 6:
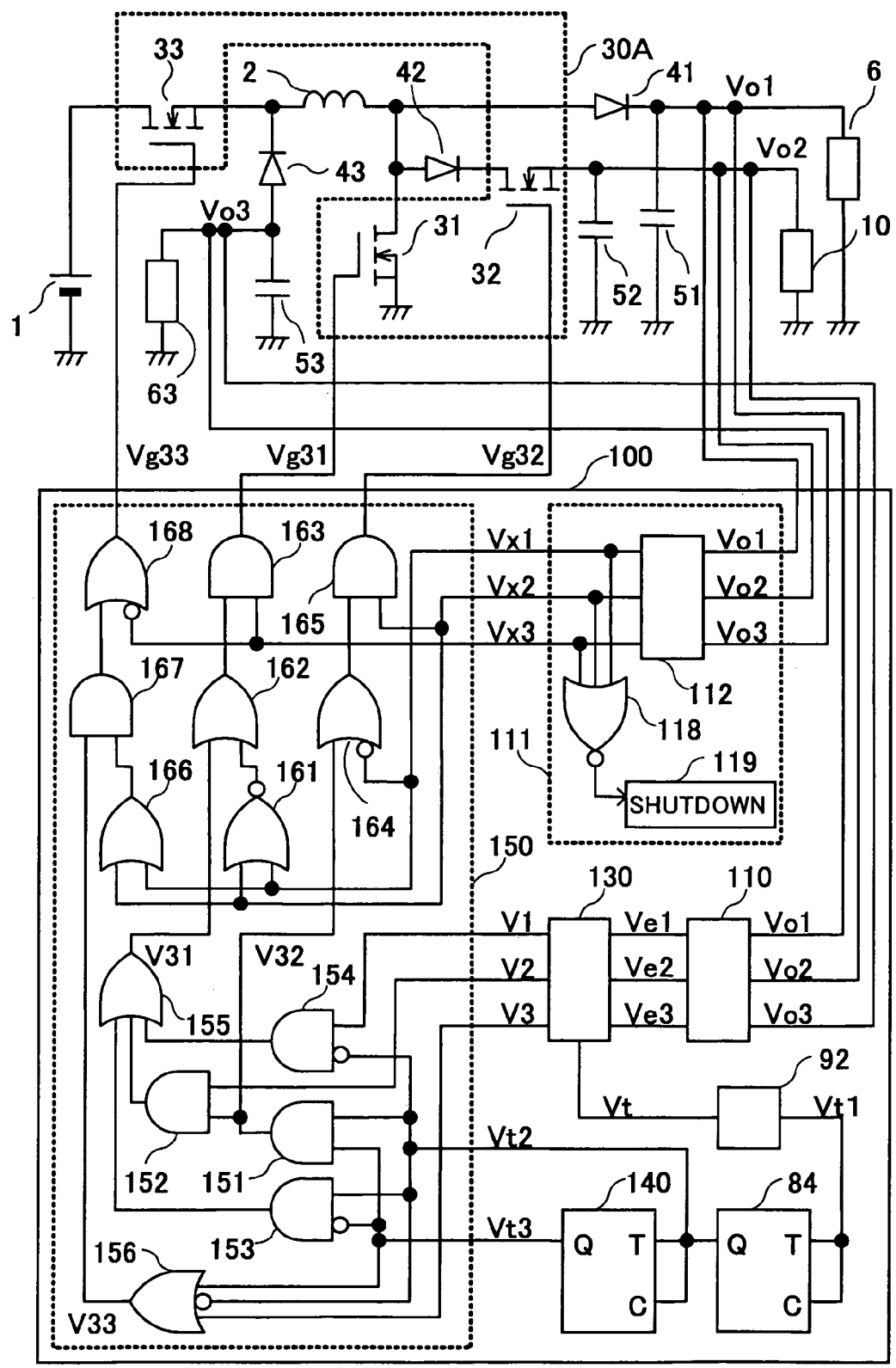
FIG. 6 is a circuit diagram showing the configuration of a multi-output DC-DC converter in accordance with Embodiment 3 of the present invention.

FIG. 6 is a circuit diagram showing the configuration of the multi-output DC-DC converter in accordance with Embodiment 3 of the present invention. A configuration having two step-up outputs is described in the explanations of the above-mentioned Embodiments 1 and 2. In the multi-output DC-DC converter in accordance with Embodiment 3, a configuration having two step-up outputs and one inverted output will be described below.

As shown in FIG. 6, in the multi-output DC-DC converter in accordance with Embodiment 3, an input DC voltage Ei is input from an input DC power supply 1. The multi-output DC-DC converter comprises an inductor 2, a switching circuit 30A, a diode 41, a diode 42, a diode 43, a first output capacitor 51, a second output capacitor 52, a third capacitor 53 and a control circuit 100. The switching circuit 30A comprises a first main switch 31, an auxiliary switch 32 and a second main switch 33. Each of the switches is formed of an N-MOSFET, for example. The control circuit 100 controls the main switch 31, the auxiliary switch 32 and the second main switch 33 so that they are driven in accordance with their respective predetermined ON and OFF periods. The diode 42 is connected in series with the auxiliary switch 32.

In the multi-output DC-DC converter in accordance with Embodiment 3, a first output voltage Vo1 is output from the first output capacitor 51 to a first load 6. A second output voltage Vo2 is output from the second output capacitor 52 to a second load 10. A third output voltage Vo3 is output from the third output capacitor 53 to a third load 63. The input/output conditions are represented by Vo1>Vo2>Ei>0>Vo3.

The ON state of the switching circuit 30A is a state wherein both the first main switch 31 and the second main switch 33 are ON and the input DC voltage Ei is applied to the inductor 2. At this time, the ON/OFF state of the auxiliary switch 32 is not considered. The first OFF state of the switching circuit 30A is a state wherein the first main switch 31 is OFF, the second main switch 33 is ON and the auxiliary switch 32 is OFF. When the second main switch 33 is ON and the auxiliary switch 32 is OFF, the inductor 2, the first main switch 31, the diode 41 and the capacitor 51 constitute a boost converter. The second OFF state of the switching circuit 30A is a state wherein the first main switch 31 is OFF, the second main switch 33 is ON and the auxiliary switch 32 is ON. When the second main switch 33 is ON and the auxiliary switch 32 is ON, the inductor 2, the first main switch 31, the diode 41 and the capacitor 52 constitute a boost converter. The third OFF state of the switching circuit 30A is a state wherein the first main switch 31 is ON and the second main switch 33 is OFF. At this time, the ON/OFF state of the auxiliary switch 32 is not considered. When the first main switch 31 is ON, the second main switch 33, the inductor 2, the diode 43 and the capacitor 53 constitute a buck-boost converter (inverted converter).

The output detection circuit 110 of the control circuit 100 shown in FIG. 6 detects the first output voltage Vo1, the second output voltage Vo2 and the third output voltage Vo3. The error between each output voltage and its desired value is obtained. The respective errors are amplified, and error voltages Ve1, Ve2 and Ve3 are output. The output detection circuit 110 in accordance with Embodiment 3 differs from the output detection circuit 81 in accordance with the above-mentioned Embodiment 1 or Embodiment 2 only in that the number of inverted outputs is increased by one. The fundamental operation of the output detection circuit 110 is thus similar to that of the output detection circuit 81. Hence, the configuration of the output detection circuit 110 is not described in detail.

The PWM circuit 130 of the control circuit 100 outputs a signal V1 obtained as the result of the comparison between the error voltage Ve1 and the sawtooth voltage Vt, a signal V2 obtained as the result of the comparison between the error voltage Ve2 and the sawtooth voltage Vt and a signal V3 obtained as the result of the comparison between the error voltage Ve3 and the sawtooth voltage Vt. The PWM circuit 130 in accordance with Embodiment 3 differs from the PWM circuit 83 in accordance with the above-mentioned Embodiment 1 or Embodiment 2 only in that a circuit for controlling an inverted output is additionally provided. The fundamental operation of the PWM circuit 130 is thus similar to that of the PWM circuit 83. Hence, the configuration of the PWM circuit 130 is not described in detail.

The overvoltage protection circuit 111 of the control circuit 100 has an overvoltage protection circuit 112. The overvoltage protection circuit 112 detects the first output voltage Vo1, the second output voltage Vo2 and the third output voltage Vo3, and outputs signals Vx1, Vx2 and Vx3, each of which is obtained as the result of the comparison between the absolute value of each of the output voltages and its maximum preset value. When the first output voltage Vo1 gets into an overvoltage condition, the signal Vx1 becomes low. When the second output voltage Vo2 gets into an overvoltage condition, the signal Vx2 becomes low. When the third output voltage Vo3 gets into an overvoltage condition, the signal Vx3 becomes low. Furthermore, the overvoltage protection circuit 111 has a NOR gate 118 to which the signals Vx1, Vx2 and Vx3 are input. In the case when all the outputs get into overvoltage conditions, the output of the NOR gate 118 becomes high, thereby activating a shutdown circuit 119. In other words, when the first output voltage Vo1, the second output voltage Vo2 and the third output voltage Vo3 get into overvoltage conditions, the shutdown circuit 119 is activated. When the shutdown circuit 119 is activated, the operation of the control circuit 100 is stopped, and the operation is not resumed unless the input DC voltage Ei lowers sufficiently.

The oscillation circuit 92 of the control circuit 100 is the same as the oscillation circuit 92 shown in FIG. 4 in accordance with the above-mentioned Embodiment 2 with respect to configuration. The oscillation circuit 92 outputs the clock signal Vt1 and the sawtooth voltage Vt having a predetermined cycle T.

Embodiment 3 is provided with two frequency divider circuits 84 and 140. The frequency divider circuit 84 receives the clock signal Vt1 and outputs a frequency-divided signal Vt2. The frequency divider circuit 140 receives the frequency-divided signal Vt2 and outputs a frequency-divided signal Vt3.

The drive circuit 150 of the control circuit 100 comprises an AND gate 151 to which the frequency-divided signal Vt2 and the frequency-divided signal Vt3 are input, an AND gate 152 to which the output V32 of the AND gate 151 and the signal V2 are input, an AND gate 153 to which the frequency-divided signal Vt2 and the inverted signal of the frequency-divided signal Vt3 are input, an AND gate 154 to which the signal V1 and the inverted signal of the frequency-divided signal Vt2 are input, an OR gate 155 for outputting a signal V31 obtained as the OR of the outputs of the AND gate 152, the AND gate 153 and the AND gate 154, and an OR gate 156 for outputting a signal V33 obtained as the OR of the signal V3, the inverted signal of the frequency-divided signal Vt2 and the frequency-divided signal Vt3. Furthermore, the drive circuit 150 comprises a NOR gate 161 to which the signal Vx1 and the signal Vx2 are input, an OR gate 162 to which the output of the NOR gate 161 and the signal V31 are input, an AND gate 163 to which the output of the OR gate 162 and the signal Vx3 are input, an OR gate 164 to which the inverted signal of the signal Vx1 and the signal V32 are input, an AND gate 165 to which the output of the OR gate 164 and the signal Vx3 are input, an OR gate 166 to which the signals Vx1 and Vx2 are input, an AND gate 167 to which the output of the OR gate 166 and the signal V33 are input, and an OR gate 168 to which the output of the AND gate 167 and the inverted signal of the signal Vx3 are input. The AND gate 163 outputs a drive signal Vg31 for the first main switch 31, the AND gate 165 outputs a drive signal Vg32 for the auxiliary switch 32, and the OR gate 168 outputs a drive signal Vg33 for the second main switch 33.

Since all the signals Vx1, Vx2 and Vx3 output from the overvoltage protection circuit 111 are high during the normal operation, the output of the NOR gate 161 is low, the OR gate 162 outputs the signal V31, and the AND gate 163 outputs the signal V31 as the drive signal Vg31. In addition, the OR gate 164 outputs the signal V32, and the AND-gate 165 outputs the signal V32 as the drive signal Vg32. Furthermore, the output of the OR gate 166 is high, the AND gate 167 outputs the signal V33, and the OR gate 168 outputs the signal V33 as the drive signal Vg33.

Figures 7A, 7B:
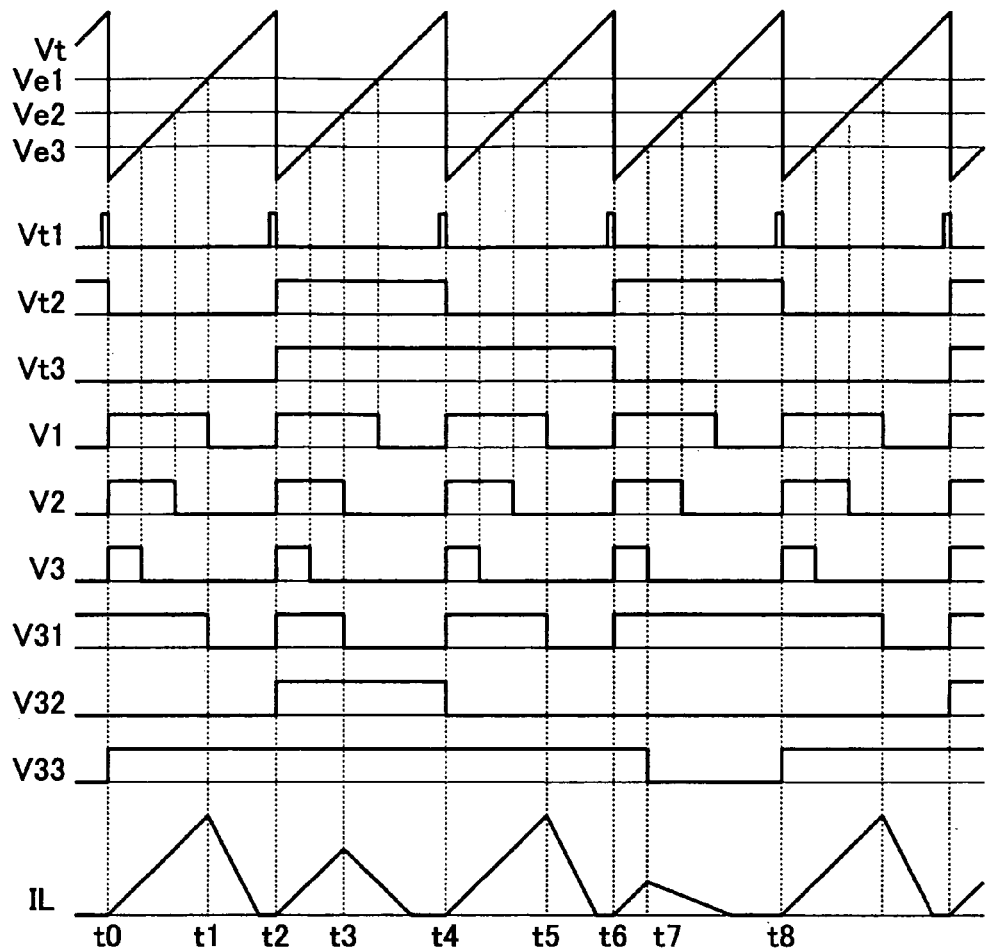
FIG. 7A is a waveform diagram showing the normal operation of the multi-output DC-DC converter in accordance with Embodiment 3 of the present invention.
FIG. 7B is a diagram showing the state of various signals in an overvoltage condition of the multi-output DC-DC converter in accordance with Embodiment 3 of the present invention.
Figure 8:
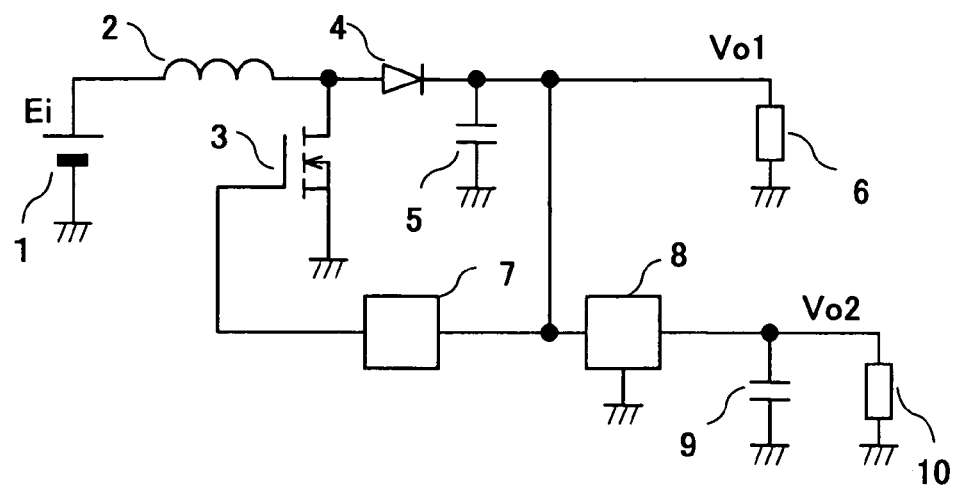
FIG. 8 is the circuit diagram showing the configuration of the conventional multi-output DC-DC converter.
Figure 9:
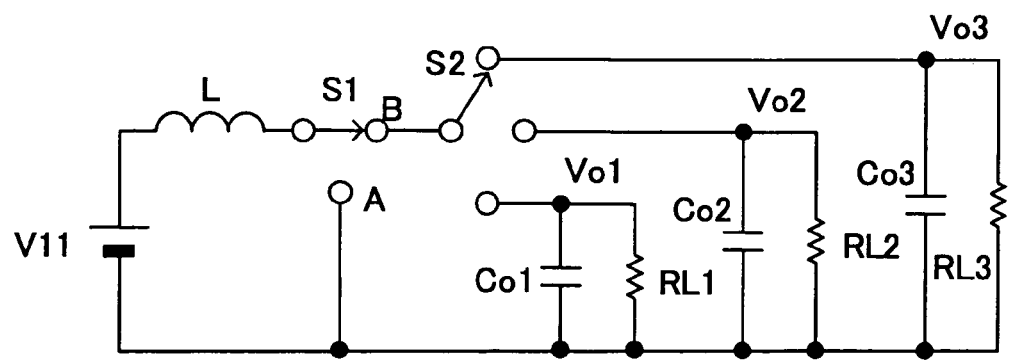
FIG. 9 is the circuit diagram showing the configuration of the conventional multi-output DC-DC converter.
Figure 10:
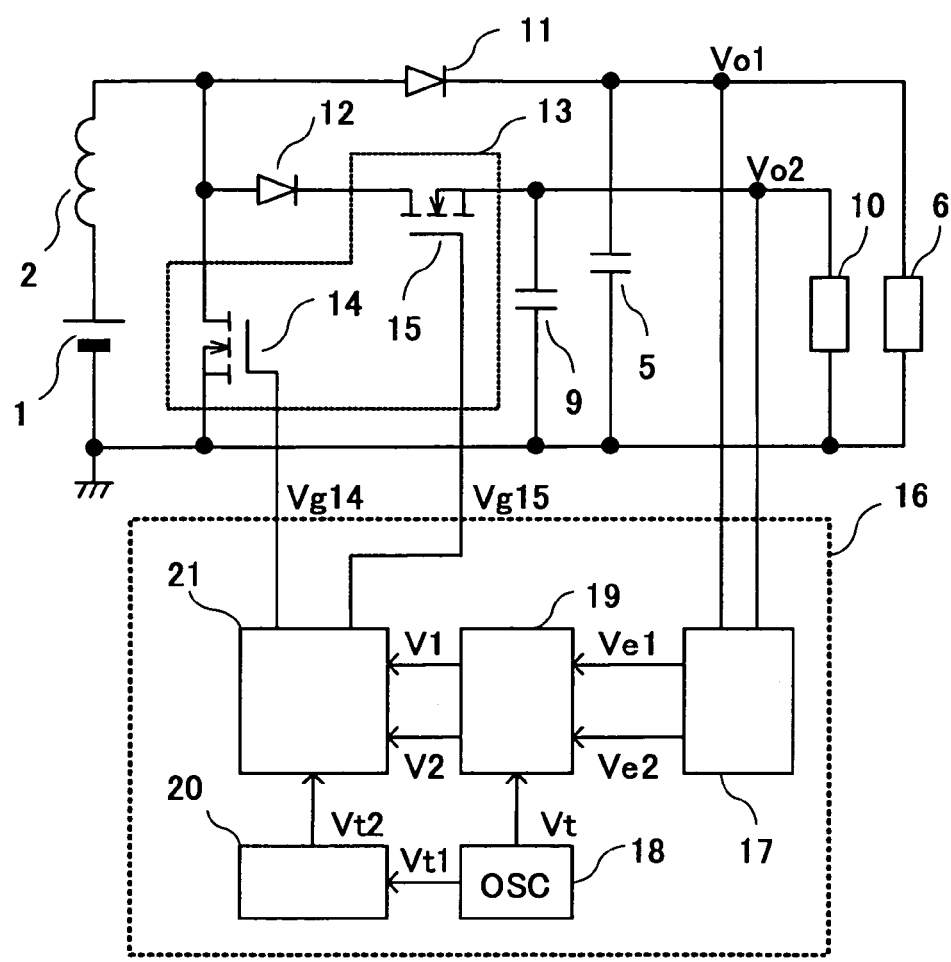
FIG. 10 is the circuit diagram showing the configuration of the conventional multi-output DC-DC converter.
Figure 11:
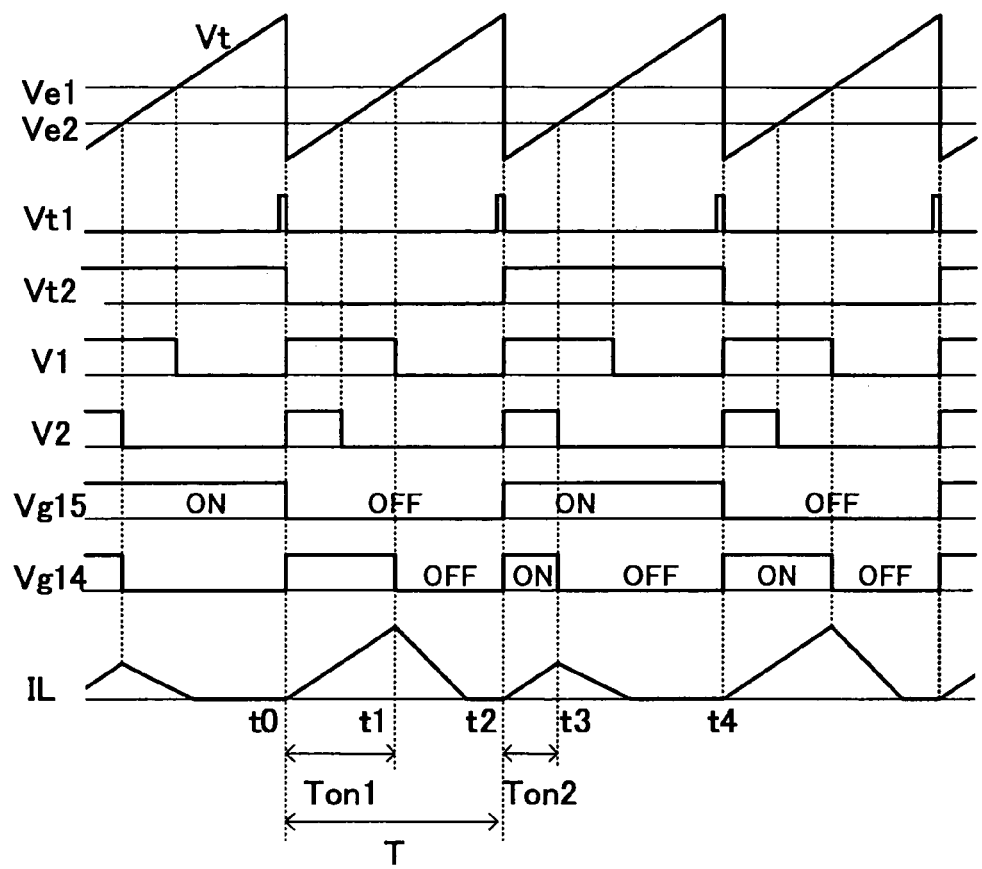
FIG. 11 is the waveform diagram showing the operation of the conventional multi-output DC-DC converter.
Figure 12:
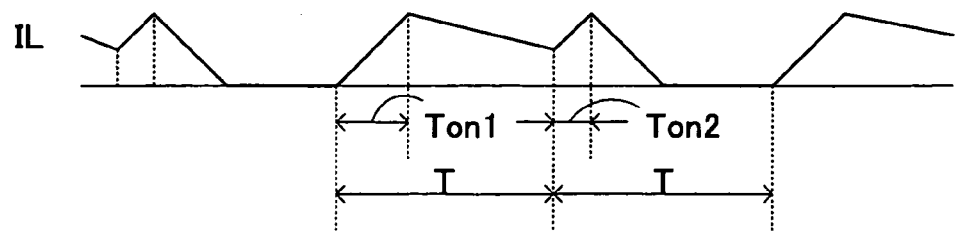
FIG. 12 is the waveform diagram showing the output current of the conventional multi-output DC-DC converter.

FIG. 7A is a diagram showing the waveforms of the various signals and the current IL flowing through the inductor 2 during the normal operation of the multi-output DC-DC converter in accordance with Embodiment 3. The normal operation of the multi-output DC-DC converter in accordance with Embodiment 3 of the present invention will be described below by using FIGS. 6, 7A and 7B.

First, it is assumed that at time t0 in FIG. 7A, the frequency-divided signal Vt2 is driven low by the clock signal Vt1 but the frequency-divided signal Vt3 remains low. At this time, since the output of the AND gate 151, that is, the signal V32, is low, the drive signal Vg32 becomes low, and the auxiliary switch 32 becomes OFF. Since both the outputs of the AND gates 152 and 153 are low, the signal V1 output from the AND gate 154 is output as the signal V31 via the OR gate 155. In other words, the signal V1 obtained as the result of the comparison between the oscillation voltage Vt and the error voltage Ve1 is selected as the drive signal Vg31. Since the signal V1, that is, the drive signal Vg31, is high, the first main switch 31 becomes ON. In addition, since the output of the OR gate 156, that is, the signal V33, is high, the drive signal Vg33 also becomes high, and the second main switch 33 becomes ON. Since both the first main switch 31 and the second main switch 33 are ON (the switching circuit 30 is ON), the input DC voltage Ei is applied to the inductor 2, and magnetic energy is stored.

When the rising oscillation voltage Vt and the error voltage Ve1 intersect with each other at time t1, the signal V1 and the drive signal Vg31 become low, whereby the first main switch 31 becomes OFF. At this time, the magnetic energy stored in the inductor 2 is released as a current for charging the capacitor 51 via the diode 41 since the auxiliary switch 32 is OFF (the switching circuit 30A is in its first OFF state). Hence, the current flowing through the inductor 2 decreases and becomes zero soon.

At time t2, both the frequency-divided signal Vt2 and the frequency-divided signal Vt3 are driven high by the clock signal Vt1, whereby the oscillation voltage Vt lowersabruptly and then starts rising. The output of the AND gate 151, that is, the signal V32, becomes high, and the drive signal Vg32 also becomes high, whereby the auxiliary switch 32 becomes ON. The AND gate 152 outputs the signal V2, and both the outputs of the AND gates 153 and 154 become low, whereby the signal V2 is output as the signal V31 via the OR gate 155. In other words, the signal V2 obtained as the result of the comparison between the oscillation voltage Vt and the error voltage Ve2 is selected as the drive signal Vg31. Since the signal V2, that is, the drive signal Vg31, is high, the first main switch 31 becomes ON. In addition, since the output of the OR gate 156, that is, the signal V33, is high, the drive signal Vg33 also becomes high, and the second main switch 33 becomes ON. Since the switching circuit 30A becomes ON at this time, the input DC voltage Ei is applied to the inductor 2, and magnetic energy is stored.

When the rising oscillation voltage Vt and the error voltage Ve2 intersect with each other at time t3, the signal V2 and the drive signal Vg31 become low, whereby the first main switch 31 becomes OFF. At this time, the magnetic energy stored in the inductor 2 is released as a current for charging the capacitor 52 via the diode 42 since the auxiliary switch 32 is ON (the switching circuit 30A is in its second OFF state). Hence, the current flowing through the inductor 2 decreases and becomes zero soon.

At time t4, the frequency-divided signal Vt2 is driven low by the clock signal Vt1, but the frequency-divided signal Vt3 remains low. The oscillation voltage Vt lowers abruptly and then starts rising again. Since the output of the AND gate 151 is low, the drive signal Vg32 also becomes low, and the auxiliary switch 32 becomes OFF. Both the outputs of the AND gates 152 and 153 are low, whereby the signal V1 output from the AND gate 154 is output as the signal V31. In other words, the signal V1 is selected as the drive signal Vg31. Since the signal V1, that is, the drive signal Vg31, is high, the first main switch 31 becomes ON. In addition, since the output of the OR gate 156, that is, the signal V33, is high, the drive signal Vg33 also becomes high, and the second main switch 33 becomes ON. Since the first main switch 31 and the second main switch 33 are ON (the switching circuit 30A is ON), the input DC voltage Ei is applied to the inductor 2, and magnetic energy is stored.

At time t5, the signal V1 and the drive signal Vg31 become low, whereby the first main switch 31 becomes OFF. Since the auxiliary switch 32 is OFF (the switching circuit 30A is in its first OFF state) at this time, the current flowing through the inductor 2 charges the capacitor 51 via the diode 41. The current flowing through the inductor 2 then decreases and becomes zero soon. The operations at time t4 and time t5 are similar to those at time t0 and time t1, respectively.

At time t6, the frequency-divided signal Vt2 is driven high and the frequency-divided signal Vt3 is driven low by the clock signal Vt1, whereby the oscillation voltage Vt lowers abruptly and then starts rising. The output of the AND gate 151, that is, the signal V32, becomes low, and the drive signal Vg32 also becomes low, whereby the auxiliary switch 32 becomes OFF. Both the outputs,of the AND gates 152 and 154 are low, but the output of the AND gate 153 is high. Hence, the signal V31 output via the OR gate 155, that is, the drive signal Vg31, becomes high, and the first main switch 31 becomes ON. In addition, the signal V3 is selected as the output of the OR gate 156, that is, the signal V33. The signal V3, that is, the drive signal Vg33, also becomes high, and the second main switch 33 becomes ON. Since the switching circuit 30A becomes ON, the input DC voltage Ei is applied to the inductor 2, and magnetic energy is stored.

When the rising oscillation voltage Vt and the error voltage Ve3 intersect with each other at time t7, the signal V3 and the drive signal Vg33 become low, whereby the second main switch 33 becomes OFF. At this time, the magnetic energy stored in the inductor 2 is released as a current for charging the capacitor 53 via the diode 43 since the first main switch 31 is ON (the switching circuit 30A is in its third OFF state). Hence, the current flowing through the inductor 2 decreases and becomes zero soon.

At time t8, the frequency-divided signal Vt2 is driven low by the clock signal Vt1, but the frequency-divided signal Vt3 remains low. The switching circuit 30A becomes ON again. After time t8, the operation at time t0 and thereafter is repeated.

It is assumed that the inductance of the inductor 2 is L, that the switching cycle is T, that the ON period of the switching circuit 30A before its first OFF state is Ton1, that the ON period of the switching circuit 30A before its second OFF state is Ton2, and that the ON period of the switching circuit 30A before its third OFF state is Ton3. In addition, it is assumed that the output current to the first load 6 is Io1, that the output current to the second load 10 is Io2, and that the output current to the third load 63 is Io3. Furthermore it is assumed that the forward voltage drops of the diodes 41, 42 and 43 are neglected. On the basis of these assumptions, the first output voltage Vo1, the second output voltage Vo2 and the third output voltage Vo3 are represented by the following equations (7), (8) and (9), respectively.

$$Vo1 = Ei + \frac{(Ei \cdot Ton1)^2}{4L \cdot T \cdot Io1} \quad (7)$$

$$Vo2 = Ei + \frac{(Ei \cdot Ton2)^2}{8L \cdot T \cdot Io2} \quad (8)$$

$$Vo3 = -\frac{(Ei \cdot Ton3)^2}{8L \cdot T \cdot Io3} \quad (9)$$

In the multi-output DC-DC converter in accordance with Embodiment 3, the error voltages Ve1, Ve2 and Ve3 change so that the first, second and third output voltages Vo1, Vo2 and Vo3 are stabilized to their respective desired voltages, whereby each ON period of the switching circuit 30A is adjusted. In other words, in the multi-output DC-DC converter in accordance with Embodiment 3, the two boost converters and the one buck-boost converter, in which the inductor 2 is commonly used, are subjected to time-sharing control. Hence, the first, second and third output voltages Vo1, Vo2 and Vo3 are stabilized to their respective desired voltages. In the above-mentioned Embodiment 3, a case wherein a half of the switching frequency is assigned to the control of the first output voltage Vo1, a quarter of the switching frequency is assigned to the control of the second output voltage Vo2, and a quarter of the switching frequency is assigned to the control of the third output voltage Vo3 is taken as an example. In the multi-output DC-DC converter in accordance with the present invention, the switching frequencies to be assigned to the control of the respective output voltages are determined so as to have appropriate ratios.

FIG. 7B shows the state of the drive signal Vg31 obtained by the OR gates 161 and 162 and the AND gate 163, the state of the drive signal Vg32 obtained by the OR gates 164 and the AND gate 165, and the state of the drive signal Vg33 obtained by the OR gates 166 and 168 and the AND gate 167, depending on the high and low states of the signals Vx1, Vx2 and Vx3.

State I(1) in FIG. 7B corresponds to the normal operation condition wherein all the signals Vx1, Vx2 and Vx3 are high. In addition, state VIII(8) is the abnormal condition wherein all the signals Vx1, Vx2 and Vx3 are low. In this case, the output of the NOR gate 118 becomes high, and the shutdown circuit 119 is activated.

At the time of starting or overload, the operation in the case when one of the output voltages is in an overvoltage condition, shown in states II(2) to VII(7), will be described below.

States II(2) to IV(4) in FIG. 7B correspond to a case wherein the first load 6 is increased and the first output current Io1 is in an overcurrent condition, for example. In this case, a phenomenon occurs wherein the current flowing through the inductor 2 does not become zero within the switching cycle assigned to the control of the first output voltage Vo1.

The magnetic energy not released but remaining in the inductor 2 is released as a current for charging the capacitor 53 in the third OFF state (the first main switch 31 is ON, the auxiliary switch 32 is OFF, and the second main switch 33 is OFF) in the next switching cycle. If the average value of this release current is larger than the current consumed by the third load 63, the third output voltage Vo3 gets into an overvoltage condition, and the signal Vx3 become low. State II(2) corresponds to the above-mentioned condition wherein the signals Vx1 and Vx2 are high and the signal Vx3 is low. At this time, the drive signal Vg31 become low, and the drive signal Vg32 becomes the signal V32. However, since the third OFF state continues, the drive signal Vg32 becomes low in the circuit configuration of Embodiment 3. Then, the drive signal Vg33 becomes high, and the switching circuit 30A gets into its first OFF state (the first main switch 31 is OFF, the auxiliary switch 32 is OFF, and the second main switch is ON). Hence, the release of the magnetic energy of the inductor 2 is shifted from the third output to the first output, whereby the overvoltage condition of the third output voltage Vo3 is avoided.

In the case of state III(3), the magnetic energy not released but remaining in the inductor 2 is released as a current for charging the capacitor 52 in the second OFF state (the first main switch 31 is OFF, the second main switch 33 is ON, and the auxiliary switch 32 is ON) in the next switching cycle. If the average value of this release current is larger than the current consumed by the second load 10, the second output voltage Vo2 gets into an overvoltage condition, and the signal Vx2 become low. At this time, the drive signal Vg31 is the signal V31. However, since the second OFF state continues, the drive signal Vg31 becomes low. The drive signal Vg32 becomes low, and the drive signal Vg33 becomes the signal V33. However, since the second OFF state continues, the drive signal Vg33 becomes high. In other words, the switching circuit 30A gets into its first OFF state. Hence, the release of the magnetic energy of the inductor 2 is shifted from the second output to the first output, whereby the overvoltage condition of the second output voltage Vo2 is avoided.

In the case of state IV(4), both the second output voltage Vo2 and the third output voltage Vo3 get into overvoltage conditions, and the signals Vx2 and Vx3 become low. At this time, the drive signal Vg31 becomes low, the drive signal Vg32 becomes low, and the drive signal Vg33 becomes high. In other words, the switching circuit 30A gets into its first OFF state. The release of the magnetic energy of the inductor 2 is shifted to the first output, whereby the overvoltage conditions of the second output voltage Vo2 and the third output voltage Vo3 are avoided.

Next, in the case of state V(5), the second output current Io2 or the third output current Io3 is in an overcurrent condition, for example. In this case, a phenomenon occurs wherein the current flowing through the inductor 2 does not become zero within the switching cycle assigned to the control of the second output voltage Vo2 or the third output voltage Vo3. The magnetic energy not released but remaining in the inductor 2 is released as a current for charging the capacitor 51 in the first OFF state in the next switching cycle. If the average value of this release current is larger than the current consumed by the first load 6, the first output voltage Vo1 gets into an overvoltage condition, and the signal Vx1 become low. At this time, the drive signal Vg31 is the signal V31. However, since the first OFF state continues, the drive signal Vg31 becomes low. The drive signal Vg33 becomes the signal V33. However, since the first OFF state continues, the drive signal Vg33 becomes high. Furthermore, the drive signal Vg32 becomes high. As a result, the switching circuit 30A gets into its second OFF state. The release of the magnetic energy of the inductor 2 is shifted from the first output to the second output, whereby the overvoltage condition of the first output voltage Vo1 is avoided.

In the case of state VI(6), the second output current Io2 is in an overcurrent condition and the other output currents are very small, for example. The magnetic energy not released but remaining in the inductor 2 within the switching cycle assigned to the control of the second output voltage Vo2 raises the first output voltage Vo1 to an overvoltage condition in the first OFF state in the next switching cycle. In addition, in the third OFF state in the next switching cycle, the third output voltage Vo3 is raised to an overvoltage condition. Furthermore, the signals Vx1 and Vx3 become low. At this time, the drive signal Vg31 becomes low, the drive signal Vg32 becomes high, and the drive signal Vg33 becomes high. In other words, the switching circuit 30A gets into its second OFF state. The release of the magnetic energy of the inductor 2 is shifted to the second output, whereby the overvoltage conditions of the first output voltage Vo1 and the overvoltage condition of the third output voltage Vo3 are avoided.

In the case of state VII(7), the third output current Io3 is in an overcurrent condition and the other output currents are very small, for example. The magnetic energy not released but remaining in the inductor 2 within the switching cycle assigned to the control of the third output voltage Vo3 raises the first output voltage Vo1 to an overvoltage condition in the first OFF state in the next switching cycle. In addition, in the second OFF state in the next switching cycle, the second output voltage Vo2 is raised to an overvoltage condition. Furthermore, the signals Vx1 and Vx2 become low. At this time, the drive signal Vg31 becomes high, the drive signal Vg32 becomes low, and the drive signal Vg33 becomes low. In other words, the switching circuit 30A gets into its third OFF state. The release of the magnetic energy of the inductor 2 is shifted to the third output, whereby the overvoltage conditions of the first output voltage Vo1 and the overvoltage condition of the second output voltage Vo2 are avoided.

As described above, in the above-mentioned Embodiment 3 in accordance with the present invention, even if the current flowing through the inductor 2 does not become zero within one switching cycle and the output voltage rises and becomes uncontrollable at the time of starting or overload, the overvoltage condition is detected, and the magnetic energy remaining in the inductor 2 is released to the other output. Hence, the overvoltage condition can be avoided.

As made obvious from the detailed explanations of the embodiments, the present invention has the following effects.

The multi-output DC-DC converter in accordance with the present invention comprising a plurality of converters, wherein the main switch and the inductor are commonly used so that the number of components is reduced, has an excellent effect capable of controlling any of a plurality of outputs at high efficiency.

In addition, even in the case of the abnormal condition, for example, at the time of starting or overload, the multi-output DC-DC converter in accordance with the present invention is configured so that the operation shifts to the next cycle after the current flowing through the inductor becomes zero within one switching cycle, as described in the explanations of Embodiment 1, for example. Hence, it is possible to avoid an overvoltage condition due to the occurrence that the current flowing through the inductor does not become zero within one switching cycle.

Furthermore, the multi-output DC-DC converter in accordance with the present invention is configured as described below. For example, as described in the explanations of Embodiments 2 and 3, the current flowing through the inductor does not become zero within one switching cycle occurs in some cases since the switching cycle is fixed. However, the resulting overvoltage condition is detected, and the current is released to the other output. Therefore, the multi-output DC-DC converter has an excellent effect capable of avoiding the overvoltage condition.

Although the present invention has been described with respect to its preferred embodiments in sine detail, the disclosed contents of the preferred embodiments may change in the details of the structure thereof, and any changes in the combination and sequence of the components may be attained without departing from the spirit and scope of the claimed invention.

The invention claimed is:

1. A multi-output DC-DC converter comprising first to nth (n: an integer of 2 or more) output circuits for receiving an input DC voltage and for outputting first to nth output DC voltages, a switching circuit, an inductor and a control circuit, wherein said switching circuit has an ON state, in which said input DC voltage is applied to said inductor and magnetic energy is stored, and has first to nth OFF states, in which said magnetic energy is released to one of said first to nth output circuits, said control circuit is configured to distribute the switching cycles of said switching circuit to first to nth outputs to be controlled and to detect said first to nth output DC voltages, and further configured, in the case when one switching cycle of said switching circuit is used to control a kth ($1 \leq k \leq n$) output, to select a kth OFF state after the period of said ON state is adjusted so that said kth output DC voltage becomes a predetermined value, and to select an OFF state other than said kth OFF state when said kth output DC voltage exceeds a predetermined upper limit value.

2. A multi-output DC-DC converter in accordance with claim 1, wherein the operation thereof is stopped when all of said 1st to nth output DC voltages exceed their upper limit values having been set respectively.

3. A multi-output DC-DC converter comprising first to nth (n: an integer of 2 or more) output circuits for receiving an input DC voltage and for outputting first to nth output DC voltages, a switching circuit, an inductor and a control circuit, wherein said switching circuit has an ON state, in which said input DC voltage is applied to said inductor and magnetic energy is stored, and has first to nth OFF states, in which said magnetic energy is released to one of said first to nth output circuits, said control circuit is configured to distribute the switching cycles of said switching circuit to first to nth outputs to be controlled and to detect said first to nth output DC voltages, and further configured, in the case when one switching cycle of said switching circuit is used to control a kth ($1 \leq k \leq n$) output, to select a kth OFF state after the period of said ON state is adjusted so that said kth output DC voltage becomes a predetermined value, and to shift said kth OFF state to said ON state after the release of said magnetic energy stored in said inductor to said kth output circuit is completed, and the switching cycle of said switching circuit or the period from said first to nth OFF state is not smaller than a predetermined value.

* * * * *